(12) United States Patent
Morimura

(10) Patent No.: US 9,292,800 B2
(45) Date of Patent: Mar. 22, 2016

(54) STATISTICAL ESTIMATION OF ORIGIN AND DESTINATION POINTS OF TRIP USING PLURALITY OF TYPES OF DATA SOURCES

(71) Applicant: International Business Machines Corporation, Armonk, NY (US)

(72) Inventor: Tetsuro Morimura, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 126 days.

(21) Appl. No.: 14/057,142

(22) Filed: Oct. 18, 2013

(65) Prior Publication Data

US 2014/0136453 A1 May 15, 2014

(30) Foreign Application Priority Data

Nov. 9, 2012 (JP) .................................. 2012-247403

(51) Int. Cl.
| | |
|---|---|
| G06F 15/18 | (2006.01) |
| G06N 99/00 | (2010.01) |
| G06Q 10/04 | (2012.01) |
| G06Q 50/30 | (2012.01) |
| G08G 1/01 | (2006.01) |
| G06N 7/00 | (2006.01) |

(52) U.S. Cl.
CPC .............. *G06N 99/005* (2013.01); *G06Q 10/04* (2013.01); *G06Q 50/30* (2013.01); *G08G 1/0112* (2013.01); *G08G 1/0129* (2013.01); *G06N 7/005* (2013.01)

(58) Field of Classification Search
None
See application file for complete search history.

(56) References Cited

U.S. PATENT DOCUMENTS

2002/0198694 A1 12/2002 Yang et al.

FOREIGN PATENT DOCUMENTS

| JP | 06266993 A | 9/1994 |
|---|---|---|
| JP | H11144182 A | 5/1999 |
| JP | 2007232568 A | 9/2007 |
| JP | 2008146127 A | 6/2008 |
| JP | 2008282161 A | 11/2008 |
| JP | 2012117829 A | 6/2012 |

OTHER PUBLICATIONS

Travel-Time Prediction using Gaussian Process Regression: A Trajectory-Based Approach Tsuyoshi Ide Sei Kato—2009 IBM Research, Tokyo Research Laboratory {goodidea, seikato}@jp.ibm.com.*
City-Scale Traffic Estimation from a Roving Sensor Network—2012 Javed Aslam—Sejoon Lim—Xinghao Pan.*

(Continued)

*Primary Examiner* — Kakali Chaki
*Assistant Examiner* — Ababacar Seck
(74) *Attorney, Agent, or Firm* — Cantor Colburn LLP; Keivan Razavi

(57) ABSTRACT

A method of predicting the origin and destination points of an unknown trip using a computer includes receiving an input of second marker information including the type and position of a known marker included in a second region; generating a second feature vector at each spot included in the second region on the basis of the second marker information; and predicting the probability that the respective spots included in the second region are the origin and destination points on the basis of a prediction model, which is acquired based on first marker information including the type and position of a known marker included in a first region and information on the known origin and destination points included in the first region, and the second feature vector.

16 Claims, 5 Drawing Sheets

(56) References Cited

OTHER PUBLICATIONS

Akira Tajima et al.,"Research and development on a large-scale mobility society simulator to reduce CO2 emission from automobiles" Scope, 8th Result Presentation, Ministry of Internal Affairs and Communications, Japan, dated prior to Nov. 2015, 3 pgs.

Yasunori, "A new paradigm for traffic planning" Gijyutsu shoin, Japan, dated prior to Nov. 17, 2015; p. 82-91 p. 126-128.

* cited by examiner

US 9,292,800 B2

STATISTICAL ESTIMATION OF ORIGIN AND DESTINATION POINTS OF TRIP USING PLURALITY OF TYPES OF DATA SOURCES

PRIORITY

This application claims priority to Japanese Patent Application No. 2012-247403, filed Nov. 9, 2012, and all the benefits accruing therefrom under 35 U.S.C. §119, the contents of which in its entirety are herein incorporated by reference.

BACKGROUND

Embodiments of the present invention relate to an information processing technique, and more particularly to a technique of statistically estimating the origin and destination points of a trip by using a plurality of types of data sources.

In order to perform an accurate traffic simulation in an extensive area at a city level, it is necessary to obtain wide-area and granular (for example, in units of an intersection) origin and destination points (OD) of a trajectory of a car or a person.

Exemplary references include Japanese Patent Application Publication No. Hei 6-266993, and Japanese Patent Application Publication No. 2008-282161.

SUMMARY

In one embodiment, a method of predicting the origin and destination points of an unknown trip using a computer includes receiving an input of second marker information including the type and position of a known marker included in a second region; generating a second feature vector at each spot included in the second region on the basis of the second marker information; and predicting the probability that the respective spots included in the second region are the origin and destination points on the basis of a prediction model, which is acquired based on first marker information including the type and position of a known marker included in a first region and information on the known origin and destination points included in the first region, and the second feature vector.

In another embodiment, a computer which predicts the origin and destination points of an unknown trip includes means for receiving an input of second marker information including the type and position of a known marker included in a second region; means for generating a second feature vector at each spot included in the second region on the basis of the second marker information; and means for predicting the probability that the respective spots included in the second region are the origin and destination points on the basis of a prediction model, which is acquired based on first marker information including the type and position of a known marker included in a first region and information on the known origin and destination points included in the first region, and the second feature vector.

DETAILED DESCRIPTION

Figure 1:
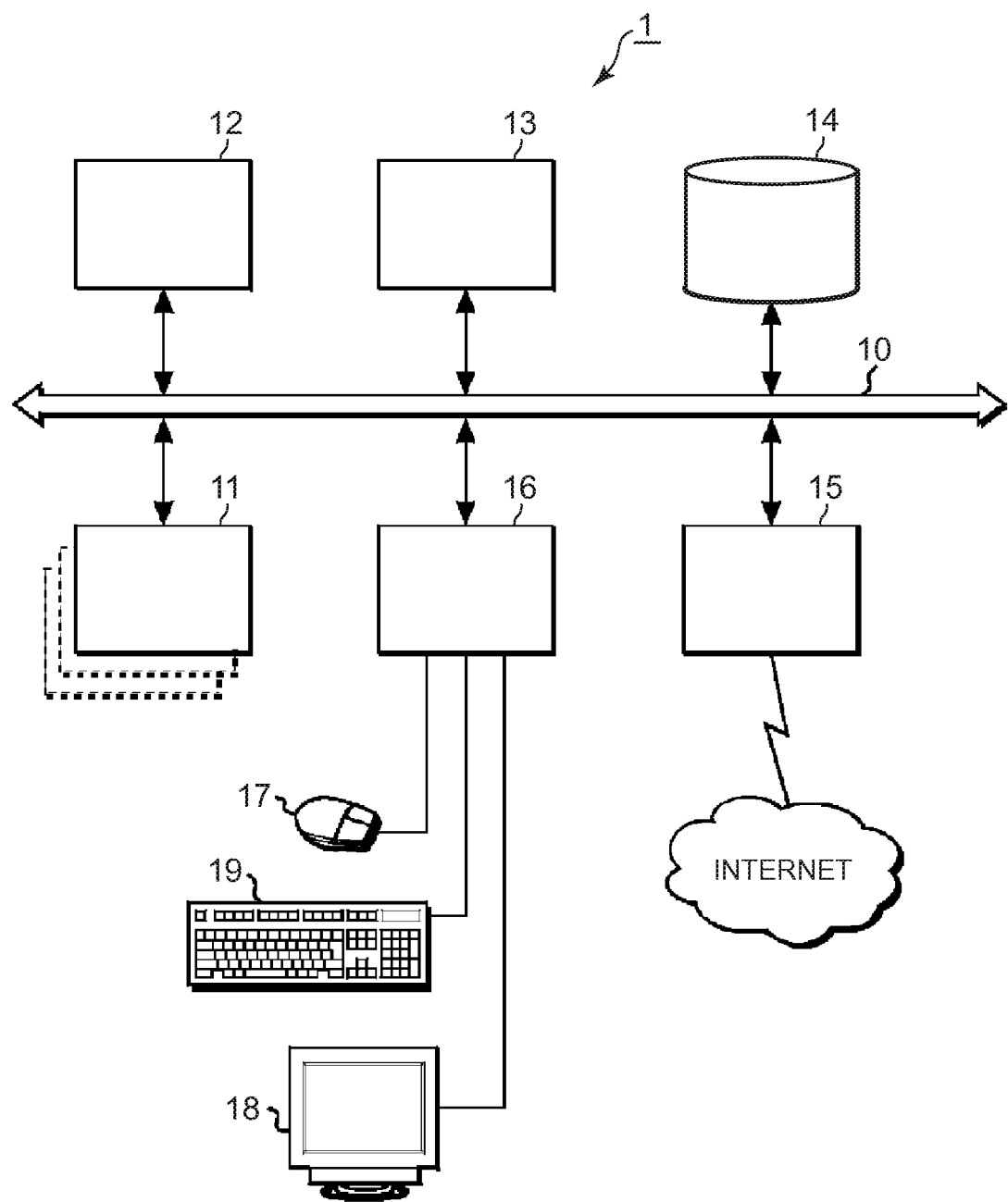
FIG. 1 is a block diagram illustrating the hardware configuration of a computer.

An existing wide-area OD estimation method using census data is limited in its granularity to the estimation at a district level (for example, in units of a few hundred of intersections). On the other hand, the use of probe data enables OD estimation in units of an intersection in its granularity. Generally, however, it is difficult to obtain wide-area probe data and consequently the target is limited to a relatively narrow area (for example, a few to a few thousand of intersections).

In view of the above problems, a method is disclosed for estimating the granular origin and destination points (OD) in a wide area by generalizing probe data in a limited area by means of wide-area and relatively easily-available landmark information. Moreover, a method of increasing the learning accuracy and prediction accuracy by using census data is also provided.

More specifically, embodiments of the present invention provide a method of predicting the origin and destination points of an unknown trip using a computer, the method including: receiving an input of second marker information including the type and position of a known marker included in a second region; generating a second feature vector at each spot included in the second region on the basis of the second marker information; and predicting the probability that the respective spots included in the second region are the origin and destination points on the basis of a prediction model, which is acquired based on first marker information including the type and position of a known marker included in a first region and information on the known origin and destination points included in the first region, and the second feature vector.

In this regard, the method may further include learning a prediction model on the basis of the first marker information including the type and position of the known marker included in the first region and the information on the known origin and destination points included in the first region. The prediction model learning may further include: receiving an input of the first marker information including the type and position of the known marker included in the first region; and generating a first feature vector at each spot included in the first region on the basis of the first marker information. Moreover, the prediction model learning may further include: receiving an input of probe data including a plurality of time-series data for latitude and longitude; and counting the number of times that each spot included in the first region is the origin or the destination on the basis of the corresponding latitude and longitude at the start or end of each time-series data.

Moreover, the prediction model may use regression with an explanatory variable as the first feature vector and an objective variable as the number of times that each spot included in the first region is the origin or the destination. The prediction model may be modeled in forms different from each other; a probabilistic model in which o is the number of trips where the spot is the origin and a probabilistic model in which d is the number of trips where the spot is the destination, with respect to each spot. Moreover, the prediction model may be modeled as a probabilistic model in which $d_{ij}$ is the number of trips where the spot i is the origin and the spot j is the destination, with respect to each spot.

Further, the prediction model may be modeled on the assumption that probability that n is the number of trips where the spot is the origin or destination conforms to the Poisson distribution, with respect to each spot. Moreover, the prediction model learning may further include: receiving an input of the first marker information including the type and position of the known marker included in the first area; and generating the first feature vector at each spot included in the first region on the basis of the first objective information, and the prediction model may linearly approximate the logarithm of a parameter $\mu$ of the Poisson distribution by using the first feature vector. The linear approximation equation may be represented by $\log \mu_i(\theta) = \omega^T \phi_i + b$, where $\mu_i$ is the parameter of the Poisson distribution at each spot i, $\phi i$ is the first feature vector, $\theta$ is a learning parameter, and b is a baseline.

Moreover, the prediction model learning may further include: receiving an input of first area information on the start area and the end area of the known trip which is included in the first region and contains a plurality of spots; and adjusting the baseline on the basis of the first area information.

In addition, the prediction model learning may further include leaning the parameter $\theta$ by minimizing a negative logarithm likelihood as an objective function. Moreover, the prediction model learning may further include leaning the parameter $\theta$ by minimizing a negative logarithm likelihood with a regularization term as an objective function.

Further, the prediction model learning may further include: performing a second-order Taylor approximation for the objective function around the current parameter estimation value; and updating the parameter to a value which minimizes an objective function L for which the second-order Taylor approximation is performed.

Furthermore, predicting the probability that the respective spots included in the second region are the origin and destination points may further include: receiving an input of second area information on the start area and the end area of the known trip which is included in the second region and contains a plurality of spots; finding start area event probability and end area event probability in each area on the basis of the second area information; and predicting the probability that the respective spots are the origin and destination points on the basis of the start area event probability and the end area event probability.

Moreover, the trip is made by a vehicle or a person and the spot may be an intersection on a road. Further, the second region may be wide in comparison with the first region. The second region may include, but does not need to include the first region.

Also in the case where embodiments of the present invention are understood as a computer program or a computer system, the invention is able to have substantially the same technical features as the case where the invention is understood as the method described above.

According to embodiments of the present invention, it is possible to provide a technique of estimating the granular origin and destination points (OD) in a wide area by generalizing probe data in a limited area by means of wide-area and relatively easily-available landmark information. Moreover, it is possible to increase the learning accuracy and prediction accuracy by using census data.

Hereinafter, exemplary embodiments of the present invention will be described in detail with reference to the accompanying drawings. It should be noted that the following embodiments are not intended to limit the scope of the appended claims, and that not all the combinations of features described in the embodiments are necessarily essential to the solving means of the present invention. In addition, embodiments of the present invention may be implemented in many different forms and should not be construed as limited to the embodiments set forth herein. Through the entirety of the description of the embodiments, (unless otherwise specified) the same reference numerals are appended to the same elements.

FIG. 1 is a block diagram illustrating the hardware configuration of a personal computer (computer) 1 according to this embodiment. The hardware configuration of the computer 1 includes a (low- and high-speed) bus 10, a CPU (arithmetic and control unit) 11 connected to the bus 10, a RAM (random access memory: storage device) 12, a ROM (read only memory: storage device) 13, a HDD (hard disk drive: storage device) 14, a communication interface 15, and an I/O interface 16. The hardware configuration further includes a mouse 17 connected to the I/O interface 16, a flat panel display (display device) 18, a keyboard 19, and the like. Although the computer 1 has been described as one using a general personal computer architecture, the CPU 11, the HDD 14, and the like are able to be multiplexed, for example, to acquire higher data processing capacity or availability. Moreover, a desktop type and other various types of computer systems are able to be used.

Figure 4:
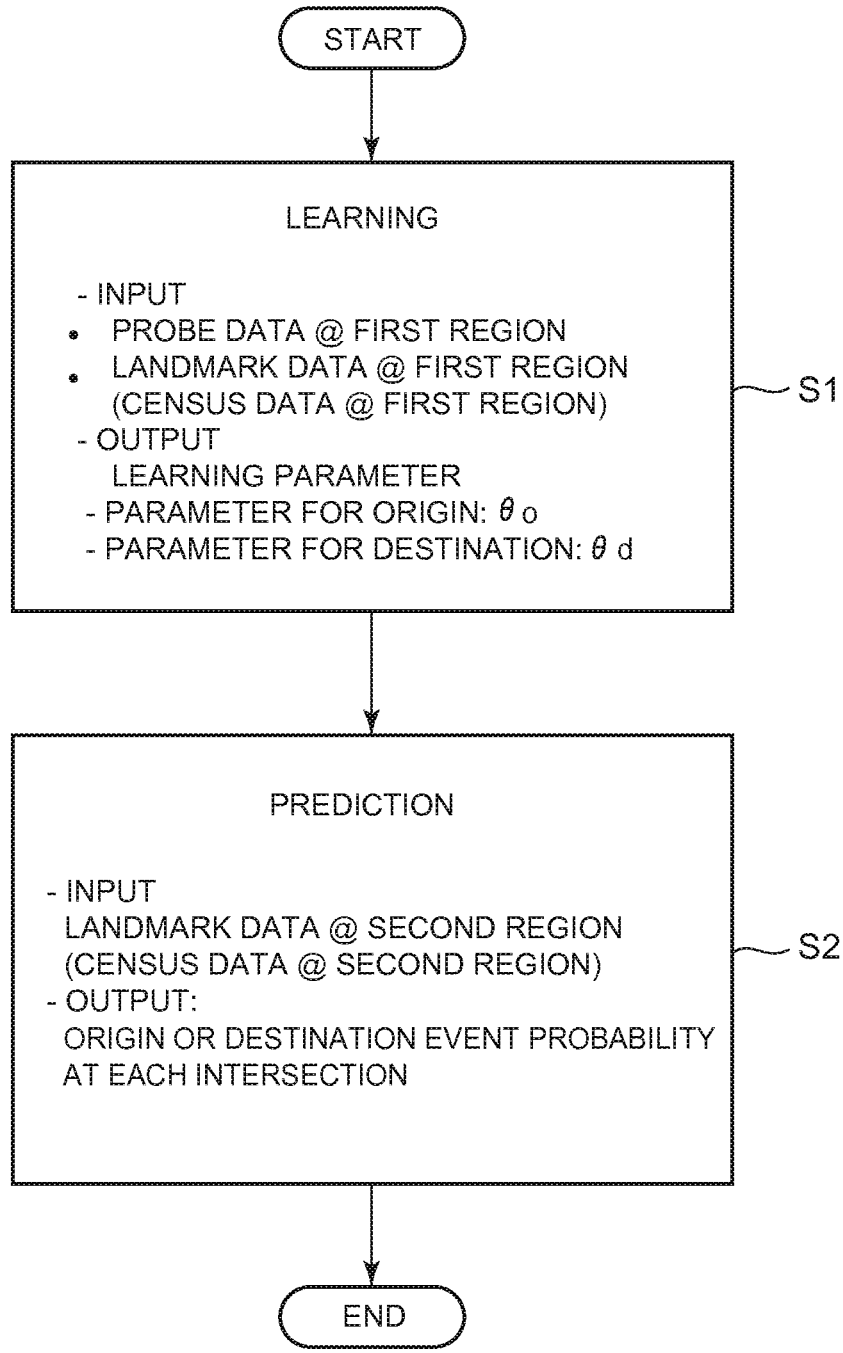
FIG. 4 is a flowchart illustrating basic processing performed by the computer.
Figure 5:
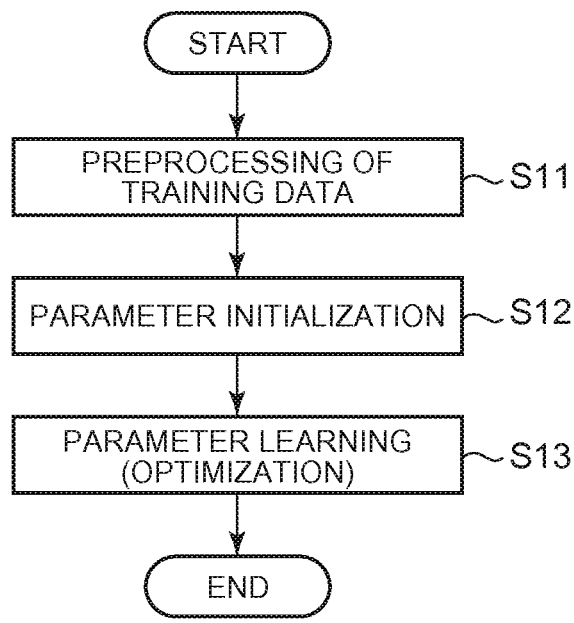
FIG. 5 is a flowchart illustrating a learning phase.
Figure 6:
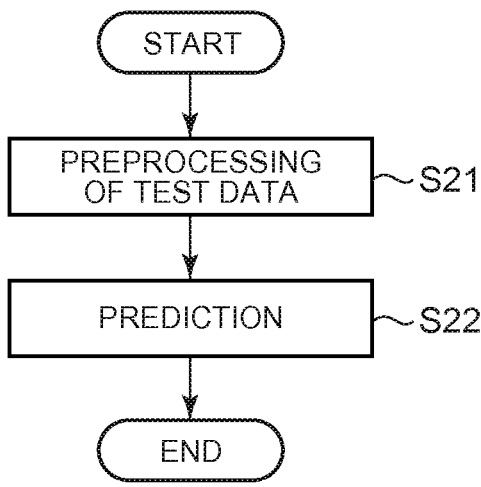
FIG. 6 is a flowchart illustrating a prediction phase.

The software configuration of the computer 1 includes an operating system (OS) providing basic functions, application software using the functions of the OS, and driver software of the I/O device. These pieces of software are loaded on the RAM 12 together with various data and executed by the CPU 11 and the like. The computer 1 functions as functional modules illustrated in FIG. 2 as a whole and performs processing illustrated in FIGS. 4 to 6. FIG. 4 is a flowchart illustrating basic processing, FIG. 5 is a flowchart illustrating a learning phase in FIG. 4, and FIG. 6 is a flowchart illustrating a prediction phase in FIG. 4.

Figure 2:
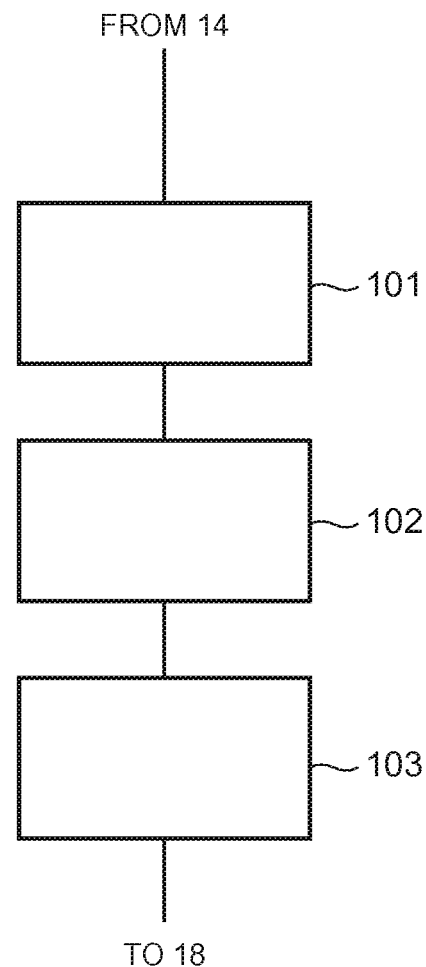
FIG. 2 is a block diagram illustrating the functions of the computer.

FIG. 2 is a block diagram illustrating functional modules of the computer 1 according to the embodiment. The computer 1 functions as a preprocessing module (input means, generation means) 101, a learning module (learning means) 102, and a prediction module (prediction means) 103 as a whole. The specific functions of the modules will be described later.

Figure 3:
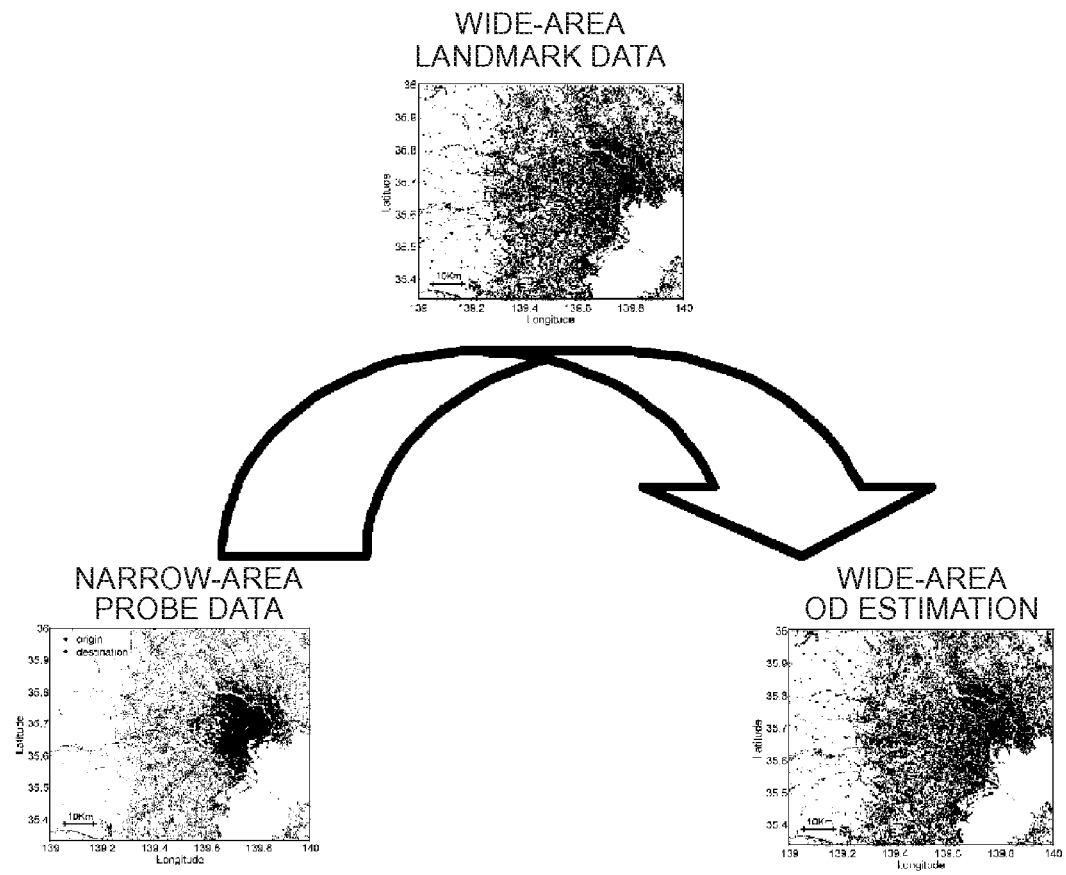
FIG. 3 is a diagram schematically illustrating the processing of the computer.

FIG. 3 is a diagram schematically illustrating the processing of the computer according to the embodiment. In this embodiment, the OD information (information on the known origin and destination points) of probe data in a limited region is generalized through landmark data (marker information) in an extensive region. Note here that the probe data is a set of time series of latitudes and longitudes collected by an in-vehicle GPS or the like, and generally the probe data is able to be acquired only in a limited area and is hard to find. On the other hand, the landmark data is data in which buildings and facilities, such as stations, hotels, and city halls, are each recorded as the type and the latitude/longitude and is relatively easily available in a wide area. Although not illustrated, it is possible to use the road traffic census (its official name is "National road/street traffic situation survey") data (hereinafter, simply referred to as "census data"). The census data includes OD information for each zone (a town level in an administrative division of Japan: several kilometers or so). For the census data, the Ministry of Land, Infrastructure, Transport and Tourism of Japan surveys the road traffic volume across the nation every few years and announces the result thereof. Therefore, the census data is easily available.

Model Construction

In this embodiment, the Poisson distribution is used to model the event probability of the OD (O: origin, D: destination) at each intersection i. In the Poisson distribution, the distribution of the number n of events that occur per a certain time is represented by an equation (1), where the parameter of the Poisson distribution is as follows:

$$\mu = \text{average}E(n) = E[(n-\mu)^2](>0) \quad \text{Eq. 1}$$

$$Pr(n|\mu) \triangleq \frac{\mu^n \exp(-\mu)}{n!}$$

Specifically, the OD event probability is able to be adjusted by adjusting the magnitude of a parameter $\mu_i$ of the Poisson distribution at each intersection i. In this specification, the logarithm of the parameter $\mu_i$ is linearly approximated (a log-linear model of $\mu_i$) as represented by an equation (2) by using a feature vector $\phi_i$ (described later) which is obtained from the landmark data. In addition, $\theta = [\omega^T, b]^T$ is a learning parameter, where $\omega$ is referred to as "linearly-combined parameter" and b is referred to as "baseline." Moreover, the technique for modeling the OD event probability is not limited to the Poisson distribution, but, for example, the gamma distribution, the logarithmic normal distribution, or the like may be used.

$$\log \mu_i(\theta) = \omega^T \phi_i + b \quad \text{Eq. 2}$$

In this embodiment, the probability $p(o_i|\phi_i, \theta_o)$ that $o_i$ is the number of trips where the intersection i is the origin is represented by an equation (3) (on the premise that the feature vector is $\phi_i$ and the learning parameter is $\theta_o$) and the probability $p(d_{ij}|\phi_{ij}, \theta_d)$ that $d_{ij}$ is the number of trips where the intersection i is the origin and the intersection j is the destination is represented by an equation (4) (on the premise that the feature vector is $\phi_{ij}$ and the learning parameter is $\theta_d$). Thus, the probabilities are modeled in different modes (different in the feature vector and the linearly-combined parameter thereof). As in this embodiment, probabilities may be modeled in consideration of the relationship between the origin and destination points of a trip. Alternatively, probabilities may be modeled as events independent of the origin and destination points, without consideration of the relationship between the origin and destination points of a trip.

$$p(o_i|\phi_i, \theta_o) = \frac{\exp(o_o(\omega_o^T \phi_i + b_o))\exp(-\exp(\omega_o^T \phi_i + b_o))}{o_i!} \quad \text{Eq. 3}$$

where $\theta_o \triangleq [\omega_o^T, b_o]^T$ $$p(d_{ij}|\phi_{ij}, \theta_d) = \frac{\exp(d_{ij}(\omega_d^T \phi_{ij} + b_d))\exp(-\exp(\omega_d^T \phi_{ij} + b_d))}{d_{ij}!} \quad \text{Eq. 4}$$

where $\theta_d \triangleq [\omega_d^T, b_d]^T$

Learning (block S1)

The preprocessing module 101 performs the preprocessing of training data (first information) (block S11). The training data includes probe data (information on the existing origin and destination points included in a first region) of the central Tokyo area of Japan and landmark data (first marker information) of the area. In addition, in order to correct the bias of the probe data, it is possible to selectively use the census data (first area information) of the area. Moreover, in the fundamental map data, each intersection i is associated with the latitude and longitude thereof and stored. Each training data, map data, and test data (described later) are previously stored in the HDD 14 and accessible from each module if needed.

The origin and destination points are extracted from the probe data of the urban central area to calculate an objective variable $o_i$ (the number of times that the intersection i is the origin of the trip [the number of origin events] and an objective variable $d_i$ (the number of times that the intersection i is the destination of the trip [the number of destination events]). The probe data is a set of time series of GPS latitudes and longitudes and is generated by collecting latitude and longitude time series from GPSs installed in a plurality of vehicles called "probe cars" for an extended period of time.

A concrete calculation method is as described below. First, the objective variables $(o_i, d_i)$ of each intersection i are initialized to (0, 0). Subsequently, the following is repeated with respect to each GPS time series. The nearest neighbor intersection is searched for from the point (position) corresponding to the first clock time in one GPS time series and then one is added to the number of origin events at the intersection. The nearest neighbor intersection is searched for from the point corresponding to the last clock time of the same GPS time series and then one is added to the number of destination events at the intersection. The above is repeated with respect to all GPS time series. For the calculation method of the objective variables, other methods may be used. For example, it is also possible to enumerate intersections near the GPS point K (a predetermined distance) apart therefrom and to determine a value to be added to the objective variable according to a relative distance from the GPS point.

Explanatory variables (feature vectors) $\psi_i, \psi_{ij}$ of each intersection i included in the urban central area are calculated from the landmark data of the central Tokyo area. The landmark data is data in which various facilities are each recorded with the type associated with the latitude/longitude. The types of facilities include, for example, hotels, stations, banks, post offices, administrative institutions, public halls, hospitals, bus stops, convenience stores, malls, department stores, fast food shops, and citizen halls.

A concrete calculation method is as described below. First, a basic feature vector $l_i$ of each intersection i is initialized. Specifically, if the total number of types of assumed landmarks is L, a vector in which all L-dimensional elements are zero is considered to be a basic feature vector $l_i$ of each intersection i. Subsequently, the following is repeated with respect to each landmark sample. The nearest neighbor intersection is searched for with respect to one landmark sample and one is added to the corresponding landmark element of the feature vector of the intersection. This process is repeated with respect to each of all landmark samples. For the calculation method of the basic feature vector $l_i$ other methods may be used. For example, it is also possible to enumerate landmarks near the intersection K (a predetermined distance such as, for example, 100 m) apart therefrom and to add one to each corresponding element of the basic feature vector. Then, the feature vector $\phi_i$ with the intersection i as the origin is acquired by an equation (5) and a feature vector $\phi_{ij}$ with the intersection i as the origin and the intersection j as the destination is acquired by an equation (6). If the destination model is defined without considering the origin, a feature vector with the intersection i as the destination is the same as a feature vector with the intersection i as the destination (for example, the equation (5)). Also in this case, the objective variable $(o_i, d_j)$ depends on whether the intersection is the origin or the destination. Therefore, the parameter $\theta_o$ differs from the parameter $\theta_d$. As a result, the event probability of the origin differs from that of the destination even at the same intersection.

$$\phi_i \triangleq l_i \quad \text{Eq. 5}$$

-continued $$\phi_{ij} \triangleq \begin{bmatrix} \sqrt{vec(l_i l_j^T)} \\ l_j \end{bmatrix} \qquad \text{Eq. 6}$$

where vec(M) is an operator which rearranges a matrix M to a longitudinal vector and $\sqrt{v}$ is a value obtained by calculating a square root for each element of a vector v.

Subsequently, the learning module 102 initializes the parameter (block S12) and learns the parameter (block S13). In this embodiment, the learning module 102 learns the parameter θ (the parameter for the origin: $\theta_o=[\omega_o^T, b_o]^T$, the parameter for the destination: $\theta_d=[\omega_d^T, b_d]^T$) by minimizing the negative logarithm likelihood with an L1 regulation term represented by an equation (7) with respect to the origin or by an equation (8) with respect to the destination as an objective function.

$$L(\theta_o) = -\sum_{i=1}^{N} \log p(o_i | \phi_i, \theta_o) + \lambda |\omega_o|_1, \qquad \text{Eq. 7}$$

where N is the total number of intersections and λ is a regularization parameter.

$$L(\theta_d) = -\sum_{i=1}^{N}\sum_{j=1}^{N} \log p(d_{ij} | \phi_{ij}, \theta_d) + \lambda |\omega_d|_1 \qquad \text{Eq. 8}$$

where N is the total number of intersections and λ is a regularization parameter.

The initialization of the parameter θ enables, for example, $\omega^T=\omega_o^T=\omega_d^T=0$ (vector), $b=b_o=b_d=1$ (scalar). Moreover, for the regularization parameter λ (>0) of the equation (7) or (8), an initial value is able to be determined by the cross validation by offering a plurality of candidates for λ.

Instead of using a fixed baseline b=1, the base line b is able to be adjusted for each zone on the basis of census data to correct a potential bias in the collecting areas of probe data. Specifically, the number of probe cars is limited and therefore a bias may occur in the collecting areas. This sometimes causes a situation where probe data shows that no OD is observed in an area, but actually an OD occurs and just incidentally no probe car is running in the area. Contrary to this, in some cases, probe data shows that a large number of ODs are observed in an area, but actually a large number of probe cars are just incidentally running in the area at the observation. Accordingly, it is desirable to introduce a baseline for adjusting a bias in probe data for each zone of census data. Each zone includes a plurality of intersections and each zone is previously associated with intersections included in the corresponding zone (for example, as preprocessing). As a result, the baseline b is able to be adjusted for each zone. Specifically, the baseline is able to be adjusted as represented by an equation (9) with the baseline for the origin as $b_o=b_i=b_{\psi_i}$. Similarly, with the baseline for the destination as $b_d=b_{ij}=b_{\psi_{ij}}$, $\psi_{ij}$ in an equation (10) is substituted for $\psi_i$ in an equation (9) and thereby $b_d=b_{ij}$ is acquired.

$$b_i = b\psi_i = b\log \frac{\sum_{n=1}^{N} I(z_n = z_i)o_n}{\sum_{n=1}^{N} I(z_n = z_i)} \qquad \text{Eq. 9}$$

where function I is an indicator function (a function which returns 1 if the argument condition is correct and 0 otherwise)

$$\psi_{ij} = \log \frac{\sum_{m=1}^{N}\sum_{n=1}^{N} I(z_m = z_i)I(z_n = z_i)d_{ij}}{\sum_{m=1}^{N}\sum_{n=1}^{N} I(z_m = z_i)I(z_n = z_i)} \qquad \text{Eq. 10}$$

In the above, when ω=0 (vector) and b=1, the average value of the Poisson distribution model coincides with the expected value of the expected number of probe cars at the intersections included in a zone $z_i$ to which the intersections belong (when a uniform distribution is supposed), as represented by an equation (11).

$$\mu_i(\theta_o = [0^T, 1]^T) = \frac{\sum_{n=1}^{N} I(z_n = z_i)o_n}{\sum_{n=1}^{N} I(z_n = z_i)} \qquad \text{Eq. 11}$$

After the parameter initialization, the learning module 102 learns the parameter (block S13). In this regard, it is difficult to find an optimal solution of the parameter analytically. Therefore, as described below, sequential optimization is performed by using the convexity of the objective function. Specifically, the objective function L in the equation (7) or (8) is secondarily approximated around the current parameter estimation value. Thereby, the secondarily-approximated function is of Lasso regression, and therefore the parameter is updated by the subgradient method. The parameter learning ends after the above sequential optimization is repeated more than once. The end condition may be set as follows: while a concrete number of repetitions depends on the number of intersections, for example, the maximum number of repetitions is set to 300 and if a predetermined convergence condition is satisfied (for example, the update amount of the parameter [$\|\theta new-\theta old\|_1$ or $\|\theta new-\theta old\|_2$: θold is a parameter before updating each number of repetitions and θnew is a parameter after the updating] is less than a certain threshold value [for example, less than 0.01]) before reaching the maximum number of repetitions, the parameter learning ends.

Prediction (block S2)

After the parameter leaning, the preprocessing module 101 performs preprocessing of test data (second information) (block S21). The test data includes the central Tokyo area of Japan and is landmark data (second marker information) of the Kanto area of Japan which is wider than the central Tokyo area. In addition, in order to increase the prediction accuracy, it is also possible to selectively use the census data (the second area information) of the area.

The preprocessing module 101 calculates the explanatory variable (feature vector) $\phi_i$, $\phi_{ij}$ of each intersection i included in the Kanto area from the landmark data of the Kanto area. The concrete method of the calculation has already been described and therefore is omitted here.

Unless the census data is used, the prediction module 103 sets the baseline used for the learning to zero with considering that the probe data used for the learning has a potential bias in collecting areas (the baselines $b_o$ and $b_d$ of $\theta_o$ and $\theta_d$ are set to zero [scalar zero]). Thereafter, the origin intersection o is selected according to the origin event probability $p_o$ of the equation (12) and the destination intersection d is selected according to the destination event probability $p_d$ of the equation (13).

$$o \sim p_o(\text{origin} = i \mid \theta_o) \triangleq \frac{\mu_i(\theta_o)}{\sum_{n=1}^{N} \mu_n(\theta_o)} \quad \text{Eq. 12}$$

$$d \sim p_{d|o}(\text{destination} = j \mid o, \theta_d) \triangleq \frac{\mu_{oj}(\theta_d)}{\sum_{n=1}^{N} \mu_{on}(\theta_d)} \quad \text{Eq. 13}$$

On the other hand, if the zone-to-zone ($z_o \rightarrow z_d$) OD event probability $p_z$ ($Z_o$, $Z_d$) is known on the basis of the OD information of the census data, the prediction module 103 selects an OD zone pair ($z_o$, $z_d$) from $p_z$ to increase the prediction accuracy by selecting the origin intersection o from the intersections within the zone $z_o$ according to $p_{o|z}$ of an equation (14) and selecting the destination intersection d from the intersections within the zone $z_d$ according to $p_{d|o,z}$ of an equation (15).

$$o \sim p_{o|z}(\text{origin} = i \mid z_o, \theta_o) \triangleq \frac{I(z_o = z_i)\mu_i(\theta_o)}{\sum_{n=1}^{N} I(z_o = z_n)\mu_n(\theta_o)} \quad \text{Eq. 14}$$

$$d \sim p_{d|o,z}(\text{origin} = j \mid o, z_d, \theta_d) \triangleq \frac{I(z_d = z_j)\mu_{oj}(\theta_d)}{\sum_{n=1}^{N} I(z_d = z_n)\mu_{on}(\theta_d)} \quad \text{Eq. 15}$$

In this embodiment, the probe data of the central Tokyo area is generalized by using the landmark data of the central Tokyo area, thereby enabling the prediction of the event probability of the origin and destination points (OD) at the intersection level in the whole Kanto area (including the central Tokyo area). Moreover, the learning accuracy and the estimation accuracy are able to be increased by using the census data. In addition, the event probability of the origin and destination points (OD) at the intersection level is able to be displayed on the display 18 or the like. Further, similarly, for example, it is possible to generalize the probe data of the central Tokyo area by using the landmark data of the central Tokyo area to predict the event probability of the origin and destination points (OD) at the intersection level in the whole Kansai area (not including the central Tokyo area).

The present invention may take the form of an embodiment entirely in hardware, entirely in software, or in a combination of elements in hardware and software. In one embodiment, the present invention is installed in software including firmware, resident software, a microcode, a parsing picocode, and the like, though the present invention is not limited thereto.

Further, embodiments of the present invention may also take the form of a computer program with a program code, which is used by a computer or an arbitrary instruction execution system or in association therewith or the form of a computer readable medium. For the purpose of the description, the computer readable medium can be an arbitrary device capable of housing, storing, communicating, propagating, or transmitting a program to be used by an arbitrary instruction execution system, apparatus, or device or to be used in association therewith. Specifically, the parsing control module constitutes an instruction execution system or a "computer" in this sense.

The medium may be an electronic, magnetic, optical, electromagnetic, infrared, or semiconductor system (or apparatus or device) or a propagation medium. An example of the computer readable medium includes a semiconductor or solid-state memory, an electromagnetic tape, a removable computer diskette, a random access memory (RAM), a read-only memory (ROM), a rigid magnetic disk, and an optical disk. An example of the optical disk at present includes a compact disk read only memory (CD-ROM), a compact disk read/write (CD-R/W) memory, and a DVD.

A data processing system appropriate for storing or executing a program code or performing both may include at least one processor connected to a memory element directly or indirectly via a system bus. The memory element may include a local memory or a bulk storage device, which is used in an actual execution process of a program code, and a cache memory, which provides at least a part of program codes with a temporary repository in order to decrease the number of times of readout from the bulk storage device during execution.

The invention claimed is:

1. A method of predicting the origin and destination points of an unknown trip using a computer, the method comprising:
receiving an input of second marker information including the type and position of a known marker included in a second region;
generating a second feature vector at each spot included in the second region on the basis of the second marker information; and
predicting the probability that the respective spots included in the second region are the origin and destination points on the basis of a prediction model, which is acquired based on first marker information including the type and position of a known marker included in a first region and information on the known origin and destination points included in the first region, and the second feature vector, wherein the prediction model is modeled on the assumption that probability that n is the number of trips where the spot is the origin or destination conforms to the Poisson distribution, with respect to each spot, and wherein the prediction model learning further includes:
receiving an input of the first marker information including the type and position of the known marker included in the first area; and
generating the first feature vector at each spot included in the first region on the basis of the first objective information, and
wherein the prediction model linearly approximates the logarithm of a parameter $\mu$ of the Poisson distribution by using the first feature vector.

2. The method according to claim 1, further comprising learning a prediction model on the basis of the first marker information including the type and position of the known marker included in the first region and the information on the known origin and destination points included in the first region.

3. The method according to claim 2, wherein the prediction model learning further includes:
receiving an input of the first marker information including the type and position of the known marker included in the first region; and generating a first feature vector at each spot included in the first region on the basis of the first marker information.

4. The method according to claim 3, wherein the prediction model learning further includes:
receiving an input of probe data including a plurality of time-series data for latitude and longitude; and
counting the number of times that each spot included in the first region is the origin or the destination on the basis of the corresponding latitude and longitude at the start or end of each time-series data.

5. The method according to claim 4, wherein the prediction model uses regression with an explanatory variable as the first feature vector and an objective variable as the number of times that each spot included in the first region is the origin or the destination.

6. The method according to claim 1, wherein the prediction model is modeled in forms different from each other; a probabilistic model in which o is the number of trips where the spot is the origin and a probabilistic model in which d is the number of trips where the spot is the destination, with respect to each spot.

7. The method according to claim 1, wherein the prediction model is modeled as a probabilistic model in which $d_{ij}$ is the number of trips where the spot i is the origin and the spot j is the destination, with respect to each spot.

8. The method according to claim 1, wherein the linear approximation equation is represented by $\log \mu_i(\theta) = \omega^T \phi_i + b$, where $\mu_i$ is the parameter of the Poisson distribution at each spot i, $\phi i$ is the first feature vector, $\theta$ is a learning parameter, and b is a baseline.

9. The method according to claim 8, the prediction model learning further includes:
receiving an input of first area information on the start area and the end area of the known trip which is included in the first region and contains a plurality of spots; and
adjusting the baseline on the basis of the first area information.

10. The method according to claim 8, wherein the prediction model learning further includes leaning the parameter $\theta$ by minimizing a negative logarithm likelihood as an objective function.

11. The method according to claim 10, wherein the prediction model learning further includes:
performing a second-order Taylor approximation for the objective function around the current parameter estimation value; and
updating the parameter to a value which minimizes an objective function L for which the second-order Taylor approximation is performed.

12. The method according to claim 8, wherein the prediction model learning further includes leaning the parameter $\theta$ by minimizing a negative logarithm likelihood with a regularization term as an objective function.

13. The method according to claim 1, wherein predicting the probability that the respective spots included in the second region are the origin and destination points further includes:
receiving an input of second area information on the start area and the end area of the known trip which is included in the second region and contains a plurality of spots;
finding start area event probability and end area event probability in each area on the basis of the second area information; and
predicting the probability that the respective spots are the origin and destination points on the basis of the start area event probability and the end area event probability.

14. The method according to claim 1, wherein the trip is made by a vehicle and the spot is an intersection on a road.

15. The method according to claim 1, wherein the second region is wide in comparison with the first region.

16. The method according to claim 1, wherein the second region does not include the first region.

* * * * *